Jan. 27, 1953 — A. B. WILSON — 2,626,831
PIPE PULLER
Filed Aug. 11, 1950 — 3 Sheets-Sheet 1
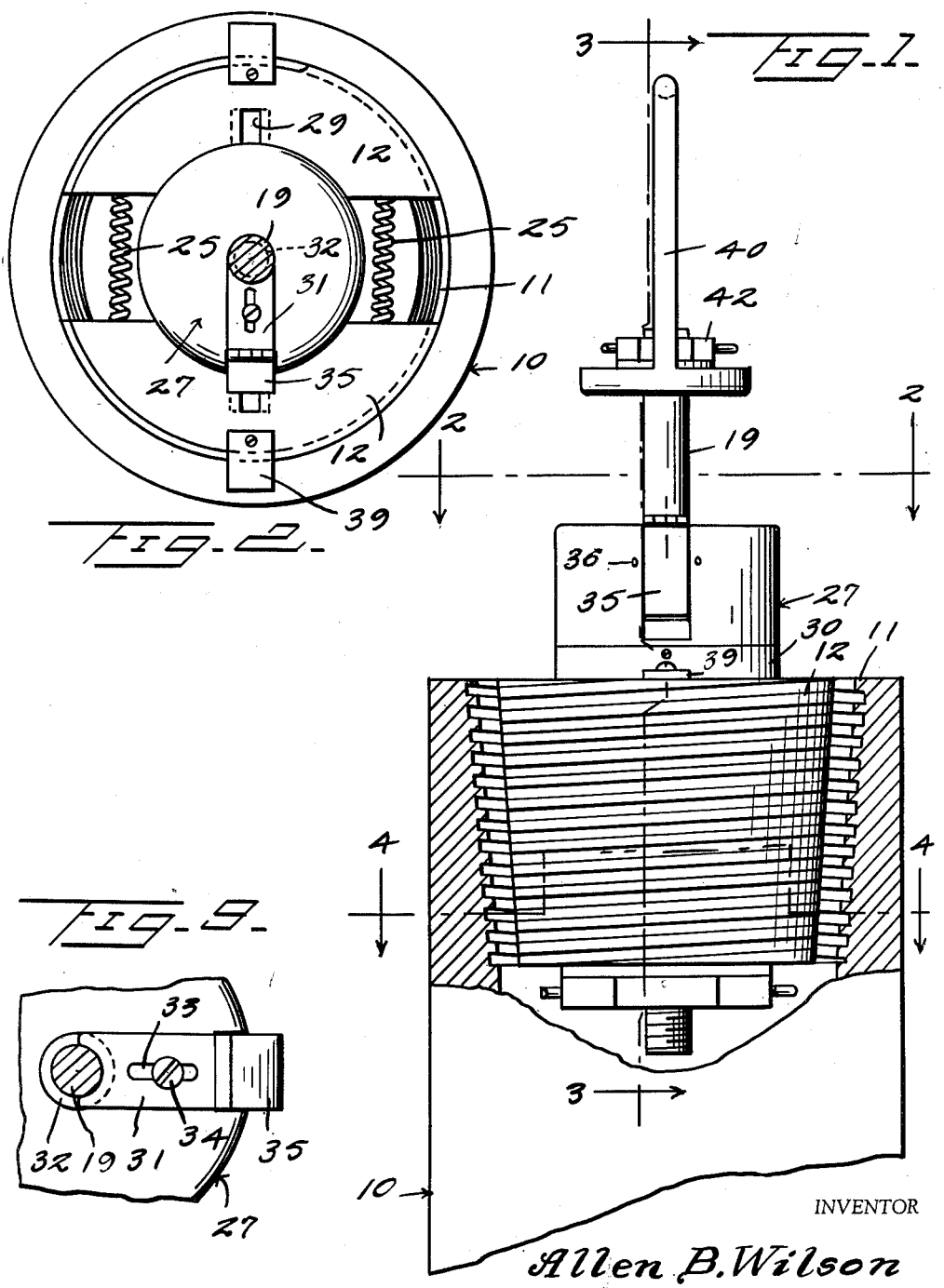
INVENTOR
Allen B. Wilson
BY Kimmel & Crowell
ATTORNEYS

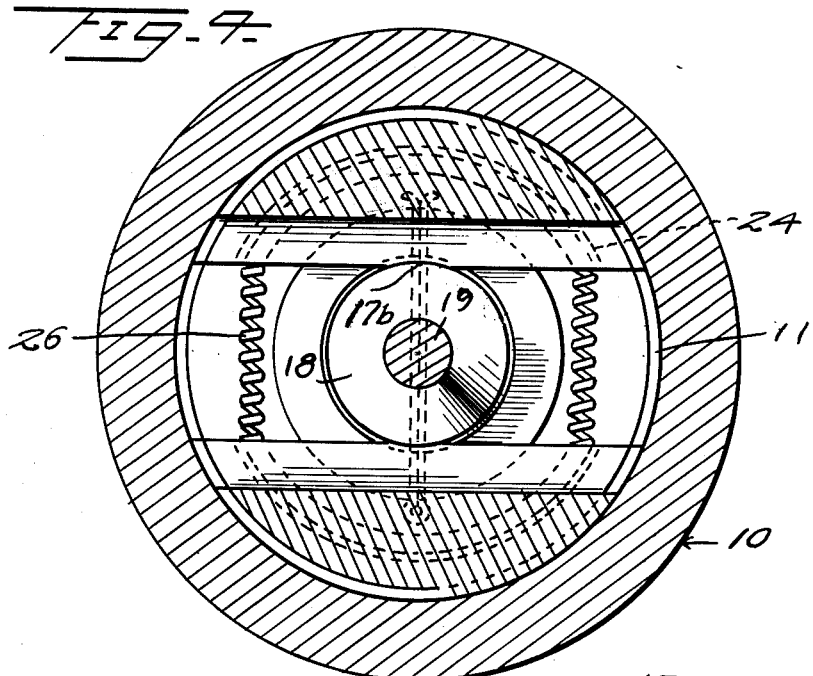
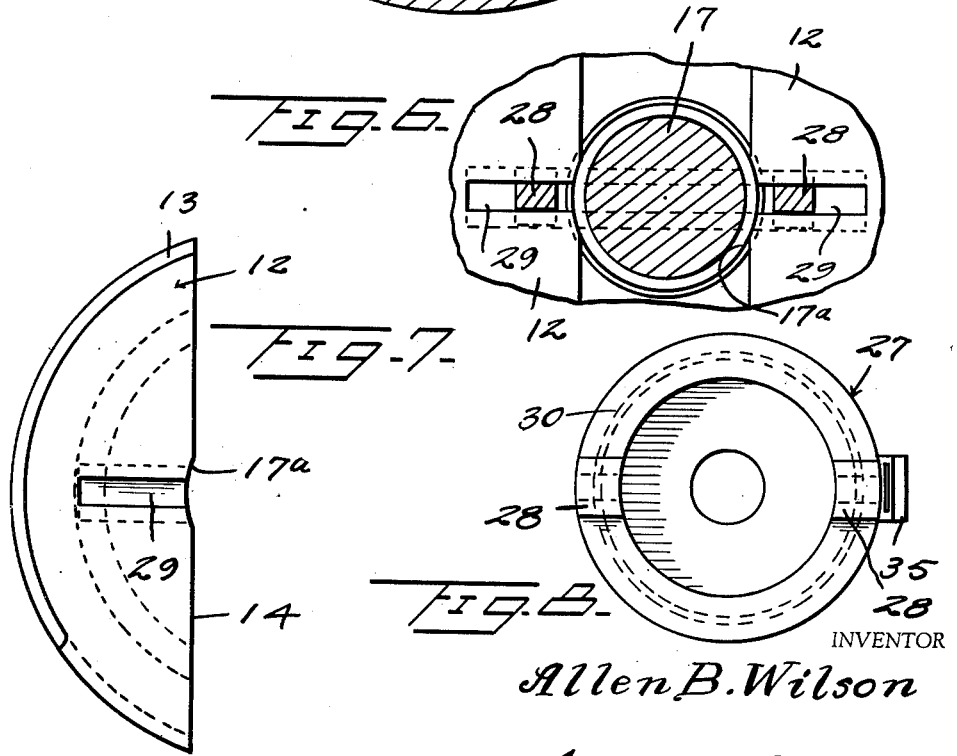

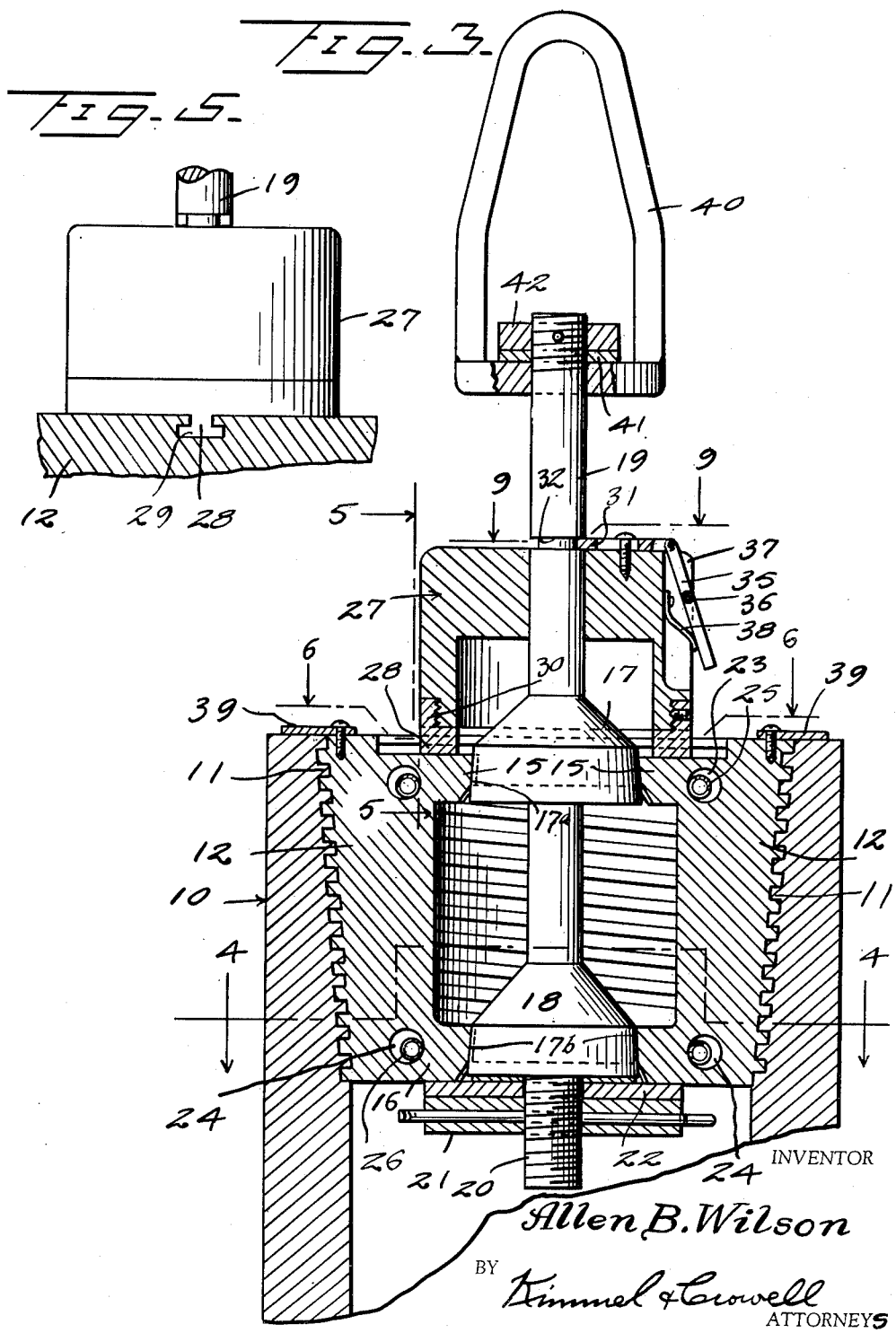

Patented Jan. 27, 1953

2,626,831

UNITED STATES PATENT OFFICE 2,626,831

PIPE PULLER

Allen B. Wilson, Galena Park, Tex.

Application August 11, 1950, Serial No. 178,865

4 Claims. (Cl. 294—96)

This invention relates to a pipe pulling device.

An object of this invention is to provide an improved means for clamping onto the upper end of a pipe or pipe coupling so that the pipe may be pulled from the ground or the like.

Another object of this invention is to provide a pipe puller of this kind which is designed to engage interior threads in the pipe or pipe coupling and to firmly clamp onto the pipe so that the latter may be pulled from the ground.

A further object of this invention is to provide a puller for pipes which is automatically moved to a released position and includes cam means for moving the gripping jaws to a gripping or clamping position.

With the above and other objects in view, my invention consists in the arrangement, combination and details of construction disclosed in the drawings and specification, and then more particularly pointed out in the appended claims.

In the drawings:

Figure 1 is a detailed side elevation partly in longitudinal section of a pipe pulling device constructed according to an embodiment of this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 3.

Figure 5 is a fragmentary sectional view taken on the line 5—5 of Figure 3.

Figure 6 is a fragmentary sectional view taken on the line 6—6 of Figure 3.

Figure 7 is a plan view of one of the gripping jaws.

Figure 8 is a plan view of the jaw locking member.

Figure 9 is a fragmentary sectional view taken on the line 9—9 of Figure 3.

Referring to the drawings, the numeral 10 designates generally a pipe or pipe coupling which is formed with threads 11 in the upper end thereof. The threads 11 are here shown as being square threads, but it will be understood that these threads may be V-threads. In order to provide a means whereby the pipe 10 may be pulled from the ground or may be elevated by an interior clamping means, I have provided a set of segmental gripping jaws generally designated as 12. Each jaw 12 is provided on the outer curved surface thereof with threads 13 and each jaw 12 tapers downwardly as shown in Figures 1 and 3. Where the inside pipe threads are not disposed on a taper, the jaws 12 will conform with the threads.

The jaws 12 are provided with straight inner edges 14 which are disposed in parallel relation, and the sum of the arcs of jaws 12 is substantially less than 360 degrees so that the jaws may be readily inserted into the upper end of the pipe or coupling 10 when in released position without initial engagement with the threads 11 of the pipe or coupling 10. Each jaw 12 is provided with upper and lower flanges 15 and 16, respectively, each of which is formed with a centrally disposed arcuate segmental cut-out portion 17a and 17b, respectively, providing a seat for respective engagement with a pair of tapered cam or jaw spreading members 17 and 18.

The cam or jaw spreading members 17 and 18 are secured to a stem or shank 19 which is formed at its lower end with a threaded stud 20 on which a nut 21 is threaded. The nut 21 has interposed between the upper side thereof and the lower ends of the jaws 12 a washer or shim 22, the purpose for which will be hereinafter described. The jaws 12 are provided with upper and lower arcuate bores 23 and 24 within which jaw contracting coil springs 25 and 26, respectively, engage. An inverted cup-shaped housing 27 is disposed at the upper ends of the jaws 12 and is provided with a pair of T-shaped locking members 28 which are slidable in diametrically opposed T-shaped slots 29 formed in the upper ends of the jaws 12. The locking members 28 provide a means whereby the jaws 12 will be held with the inner edges 14 thereof in parallel relation so that the threads 13 on the outer surfaces of the jaws will be able to snugly engage with the threads 11 of the pipe or coupling 10.

As shown in Figure 3 the cup-shaped member 27 is formed at its lower end with a screw threaded annulus 30 which carries the locking members 28. The shank 19 is adapted to be locked against endwise movement relative to the jaws 12 when the latter are in clamping or gripping position by means of a locking member 31 slidable on the upper end of the cup-shaped member 27. The shank 19 is formed with the annular keeper groove 32 within which the inner end of the locking member 31 is adapted to engage, and the locking member 31 is formed with an elongated slot 33 within which a bolt or screw 34 engages. A lock releasing lever 35 is pivotally mounted on a pivot 36 extending through the side portion of the cup-shaped member 37, and the latter is formed with a vertically disposed slot 37 within which the lever 35 engages. A spring 38 bears against the lower portion of the releasing lever 35 so as to constantly urge the locking member 31 to locking position.

A pair of stop members 39 are secured to the upper ends of the clamping or gripping members 12 and are adapted to engage the upper end of the pipe or coupling 10 so as to limit the insertion of the jaws 12 into the pipe or coupling. The clevis 40 is swively secured on the upper end of the shank 19 bearing against the lower side of a thrust washer 41 which is interposed between the clevis 40 and a nut 42 threaded onto the upper end of the shank 19.

In the use and operation of this device the clevis 40 is secured to a cable, and the gripping or clamping jaws 12 are lowered into the upper end of the pipe or coupling 10 to the limit provided by the stop members 39. The shim or washer 22 is of a thickness such that when the cam or expanding members 17 and 18 are in operative position, the shim or washer 22 will bear against the lower ends of the clamping or gripping members 12. The springs 25 and 26 will hold the clamping or gripping members 12 in retracted or released position at the time the clamping or gripping members are lowered into the pipe or coupling 10.

When the shank 19 is pulled upwardly the expanding members 17 and 18 will move the jaws or gripping members 12 laterally or outwardly so that the threads 13 will engage with the threads 11 of the pipe or couping 10. When the expanding members 17 and 18 are in their jaw expanding position, locking member 31 will engage in the keeper groove 32 of shank 19. The T-shaped locking members or guides 28 carried by the housing or cup-shaped member 27 will provide for the radial movement outwardly of the jaws 12 when they are moved to gripping position and will also provide for radial movement of the jaws when the latter are released from the pipe or coupling.

The device hereinbefore described will provide a means whereby the pipe may be pulled or elevated without threading a clamping member onto the pipe, and the clamping member can be readily released by dropping the shank 19 so that the expanding members 17 and 18 will release the jaws 12 in order that the springs 25 and 26 may move the jaws inwardly to a released position. It will be understood that the shank 19 is dropped after the shank locking member 31 is moved outwardly by rocking of lever 35 to a released position.

I claim:

1. A pipe pulling device comprising a plurality of segmental pipe clamping jaws formed with threads on the outer curved surfaces thereof for engagement with threads in the end of a pipe, each jaw having an interiorly positioned arcuate segmental cut-out portion and an upper and lower annular channel therein, means slidably connecting said jaws for contraction or expansion toward or away from each other, a coil spring extending through the upper channels of each jaw and a second coil spring extending through the lower channel of each jaw normally contracting said jaws toward each other, a beveled arcuate flange in the upper end of the interior of each jaw, a second bevelled arcuate flange in the lower end of the interior of each jaw, a shaft coaxially mounted between said jaws and longitudinally movable with respect thereto, a pair of spaced conical members fixed to said shaft one engageable with said upper beveled flanges and the other engageable with said lower bevelled flanges to expand said jaws against the bias of said springs, and lock means to hold said shaft in jaw expanding position.

2. The structure of claim 1 wherein the means for slidably connecting said jaws includes a T-shaped channel in the upper edge of each jaw, a cup-shaped member surrounding said shaft, and T-shaped projections depending from said cup-shaped member engaging in said T-shaped member whereby said jaws may slide linearly relative to said cup-shaped member.

3. The structure of claim 2 wherein the lock means includes an annular groove about said shaft and a slidable bifurcated member mounted on the top of said cup-shaped member engageable in said groove.

4. The structure of claim 1 wherein said coaxially mounted shaft has a threaded extremity extending below the lowermost portion of said jaws, a thrust washer on said extremity bearing against said jaws, and a nut threaded on said extremity bearing against said thrust washer.

ALLEN B. WILSON.

REFERENCES CITED

The following references are of record in the file of this patent:

UNITED STATES PATENTS

| Number | Name | Date |
| --- | --- | --- |
| 395,318 | Edwards | Jan. 1, 1889 |
| 434,860 | Bullock | Aug. 19, 1890 |
| 1,418,538 | Crutcher | June 4, 1922 |
| 1,445,158 | Nutter | Feb. 13, 1923 |
| 1,488,716 | Spitler | Apr. 1, 1924 |
| 1,544,659 | Lawson | July 7, 1925 |
| 1,835,193 | Wells | Dec. 8, 1931 |
| 1,843,537 | Bickerstaff | Feb. 2, 1932 |
| 2,290,409 | Cuthill | July 21, 1942 |